United States Patent [19]

Davey

[11] 4,346,320

[45] Aug. 24, 1982

[54] DYNAMOELECTRIC MACHINE HAVING IMPROVED INTERLEAVED STATOR END TURNS

[75] Inventor: Kent R. Davey, College Station, Tex.

[73] Assignee: Westinghouse Electric Corp., Pittsburgh, Pa.

[21] Appl. No.: 139,081

[22] Filed: Apr. 10, 1980

[51] Int. Cl.³ .............................................. H02K 1/16
[52] U.S. Cl. .................................... 310/179; 310/201; 310/260
[58] Field of Search ............... 310/201, 198, 184, 260, 310/195, 166, 54, 179, 180, 181, 254, 258, 259, 194

[56] References Cited

U.S. PATENT DOCUMENTS

| 268,205 | 11/1882 | Edison | 310/195 |
| 2,407,935 | 9/1946 | Perfetti et al. | 310/201 |

FOREIGN PATENT DOCUMENTS 614498  7/1978  U.S.S.R. ................................ 310/98

Primary Examiner—J. V. Truhe
Assistant Examiner—Morris Ginsburg
Attorney, Agent, or Firm—William D. Lanyi

[57] ABSTRACT

Disclosed is a dynamoelectric machine stator winding having a plurality of coil sides of varying lengths disposed in a plurality of slots located around the inner periphery of a tubular stator core. Top and bottom coil sides (radially inner and outer positions) of unequal length are placed within the slots and interconnected such that top coil sides are joined to bottom coil sides disposed in other slots when the top coil sides, as dictated by winding topology (for phase interspersed connector ring segments), are longer than the commonly slotted bottom coil sides. When the bottom coil side in a subject slot is longer than the commonly slotted top coil side, the top and bottom coil sides are lengthened and shortened, respectively, and the top and bottom coil sides in the subject slot are respectively joined to top and bottom coil sides on both axial ends of the stator. In all cases the coil sides are joined by connector ring segments interspersed according to phase and having a body portion with a common radius of curvature and a radially inwardly directed conductive arm of predetermined length on each end thereof. The length of the conductive arms are varied according to the position (top or bottom) occupied by the respective to-be-joined coil sides.

5 Claims, 6 Drawing Figures

DYNAMOELECTRIC MACHINE HAVING IMPROVED INTERLEAVED STATOR END TURNS

BRIEF DESCRIPTION OF THE PRIOR ART AND SUMMARY OF THE INVENTION

This invention relates to multiphase dynamoelectric machines having stator members with multi-loop coils disposed therein constituting a stator winding, and more particularly to joining coil sides of different lengths that are positioned in radially top and bottom positions of a first stator slot to coil sides occupying top and bottom positions in a second and third slot, respectively.

Large dynamoelectric machines designs have evolved which use a rather complicated stator winding disposed in axially extending slots formed in a stator core to handle the voltages and currents required by the loading demands made on the machine. A large number of stator slots, the use of parallel windings in each phase and the multiple turns per phase require a complex end connection for the winding's slot disposed coil sides. The end connection must be accommodated in a restricted space, be of rugged construction and provide the necessary electrical communication between the stator coil sides.

The previous design included stator winding having "diamond" shaped coils. Each coil included a predetermined number of loops with each loop having two coil sides. The coil sides each included a straight portion which ran the length of the stator slots and a complexly shaped, curved portion situated at each end which facilitated connection with other curved portions. This curved portion had a complex shape which curved axially, radially and circumferentially. The manufacturing of this coil side portion required a complex shaped three-dimensional form against which the coil sides were bent and twisted. The stator coil sides were woven together and connected in the axial end regions of the machine to form the diamond-shaped end-basket design which has been typically used on large dynamoelectric machines.

The woven together end-basket design enables completion of the necessary stator coil side connections and provides a compact and rugged structure. However, one disadvantage of the end-basket design is that the interweaving of the coil sides makes it impossible to remove a single coil side from the bottom of a stator slot without removing from twelve to eighteen top coil sides which obstruct its removal.

When a machine is damaged in the field and a bottom coil side needs repair or replacement, many top coil sides must be removed to access the bottom coil. Removal of the several top coil sides is a costly and time consuming process. Braces and wedges in a large portion of the machine must be disassembled and removed. During the unbracing process and coil side removal, the machine is susceptible to additional damage. Subsequent to the machine's disassembly and coil side repair, the coil sides must be reassembled and the bracing system rebuilt, often under field conditions which are not conducive to quality control and inspection procedures. Copending application Ser. No. 139,083, by Mr. L. Long, filed on Apr. 10, 1980 and assigned to the assignee of the present application, discloses a dynamoelectric machine having a stator winding comprising a plurality of stator coils each of which includes two straight coil sides which extend the entire length of separate stator slots with one coil side occupying a top or radially inner position and the other coil side occupying a bottom or radially outer position. The coil sides protrude rectilinearly beyond the stator into the end turn region of the stator. A C-shaped connector ring segment electrically connects the straight top and bottom coil sides. Additional connector ring segments electrically join the top and bottom coil sides to other bottom and top coil sides, respectively, to provide multi-loop coil. The C-shaped connector ring segments eliminate many of the problems encountered in coil side fabrication and reduce the time and labor required to repair machines having conventional diamond-shaped stator coils.

The forces on the stator winding in the end turn region under steady state and short circuit conditions are extremely large. For example, a typical 25,000 amp, 20 kV turbine generator may have forces from 70 to 100 lbs. per inch of coil under steady state conditions and thus create bracing problems for the designer. It has been found that these forces are comparable whether the conventional diamond-shaped end winding is used or the aforementioned connector ring segments.

In copending application Ser. No. 139,082, filed on Apr. 10, 1980 and assigned by the same assignor to the same assignee as is the present application, axial interspersal of the connector ring segments according to phase was disclosed and found useful in reducing the forces on the connector rings and coil sides by approximately one-half. This force reduction results from current levels in the immediately surrounding coil sides and connector ring segments which are one-half the magnitude of current in the subject coil sides and connector ring segments when the subject connector ring segment current is at its peak. This does not necessarily mean that the forces on all the coil loops are halved since the topology of the winding varies. The peripheral currents above and below the subject coils are such that their fields act on the subject coil sides and connector ring segments and thus appear in many cases to yield higher forces. However, when the subject coil current is peaking, the current in the surrounding coils of different phase are halved.

Calculations indicate that interspersal of connector ring segments provided a 48% reduction in the magnetic field when compared with the magnetic field of the diamond-shaped coils. This calculated reduction is regarded as conservative since some areas of the diamond-shaped coil have much higher fields than the area chosen for the calculations. As a result of such higher fields, estimates regarding total force reduction through the use of connector ring segments range up to 68%.

Phase interspersal of the connector rings also enables the leakage reactance to be reduced to that contributed by the connector rings.

Each of the stator slots have coil sides of relatively different lengths disposed therein in top (radially inner) and bottom (radially outer) positions. As such, the coil sides extend different distances beyond the end of the stator core. Such commonly slotted coil sides of differing length are typically joined to other coil sides (displaced in opposite circumferential directions from the commonly slotted coil sides) by connector ring segments. The commonly slotted top and bottom coil sides are electrically joined to the displaced bottom and top coil sides, respectively. For machines utilizing the previously mentioned interspersed connector rings, most top coil sides extend axially further than their commonly slotted, radially adjacent bottom coil sides. As such, radially directed conductive arms extend outward from and connect the commonly slotted top and bottom coil sides to separate connector rings disposed radially outside the stator slots. However, some slots in a machine of the aforementioned construction house a bottom coil side which is axially longer than the top coil side also housed therein.

When the bottom coil side is longer than a commonly slotted, radially adjacent top coil side, the top coil side cannot be joined to a connector ring solely through the usual expedient of a radially outwardly directed conductive arm since such a conductive arm would interfere with the commonly slotted bottom coil side. Occurrence of such unfavorable relative lengths of commonly slotted top and bottom coil sides can be minimized, but not eliminated. A "jogged" arm which is sequentially bent from its connection to the top coil side in a circumferential direction to clear the bottom coil side and then radially to provide a solution to the aforementioned interference.

The jogged arm, however, requires complex fabrication in addition to inducing forces per inch approximately 60% higher on the jogged arm than the highest force regions elsewhere in the winding. The radially directed portion has a large axially directed force on it and the circumferentially directed portion has a radial force on it above and below the intersection of the portions. Force analysis indicates that the forces acting on the radial conductive arms are approximately 40% less than the forces acting on the jogged arms.

In accordance with the present invention, standard top-to-bottom coil side connections (the top and bottom coil sides being separated by one pole pitch) are used repeatedly in the winding for the cases where the top coil side is relatively longer (in the axial direction) than the bottom coil side which is housed in the same stator slot. For the other cases where the bottom coil side in a slot would normally be longer than the commonly slotted top coil, the subject top and bottom coil sides are respectively joined to top and bottom coil sides on both ends of the stator. Additionally, for the other cases, the top coil sides in the subject slots are lengthened and the bottom coil sides in the subject slots are shortened so as to be shorter than the lengthened top coils. The aforementioned winding technique is used in conjunction with the interspersed connector rings.

In conclusion, a comparison with the short circuit force on the jogged arms with the radial arms of the disclosed winding indicates a 40% reduction. Reversal of the typical coil sides eliminates the problems of difficult mechanical construction and high forces while at the same time providing symmetrically arranged coil side connections on both ends of the dynamoelectric machine so as to leave the voltage per winding per phase unchanged.

DESCRIPTION OF THE PREFERRED EMBODIMENT

Figure 1:
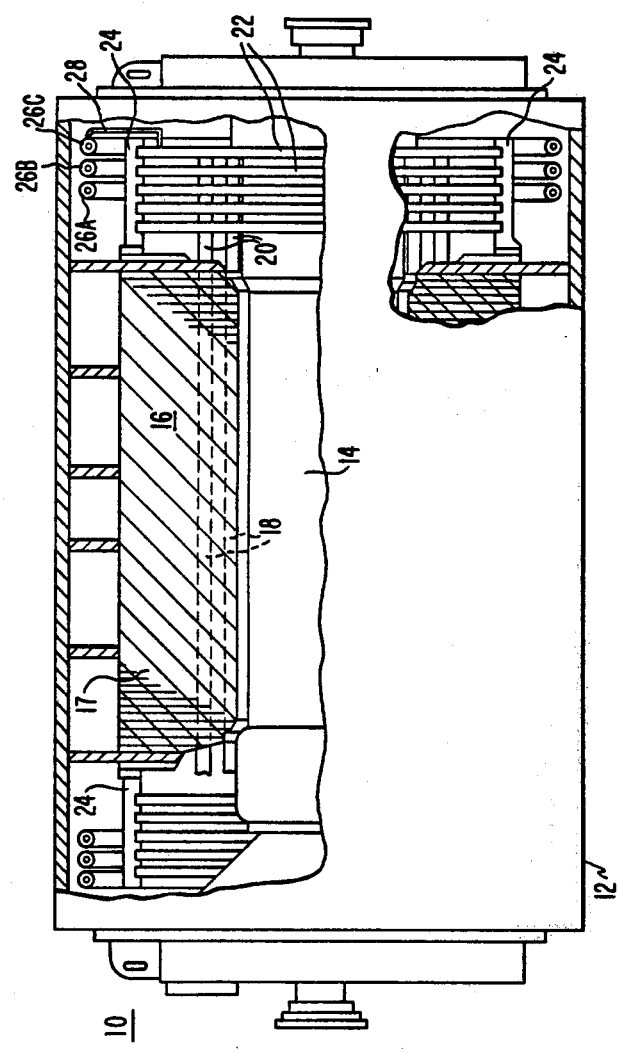
FIG. 1 is a partial sectional view of a dynamoelectric machine made in accordance with the present invention.

Referring now to the drawings, FIG. 1 shows a partial sectional view of a dynamoelectric machine 10 having an outer casting 12, a rotor 14, and a stator structure 16 including a generally tubular stator core 17 which has multiloop coils 18 disposed therein constituting a multiphase stator winding. Each loop of the multiloop coils includes two coil sides 20 which are housed in slots, not shown, formed around the inner periphery of the stator core 17 and are joined by annular connector ring segments 22. The connector ring segments 22 are held in place by a plurality of mounting brackets 24. On each end of the stator structure 16 there are three parallel rings 26A, 26B, and 26C which are part of the machine's coolant system and are connected to the stator coils 18 by insulated tubing 28.

Figure 2:
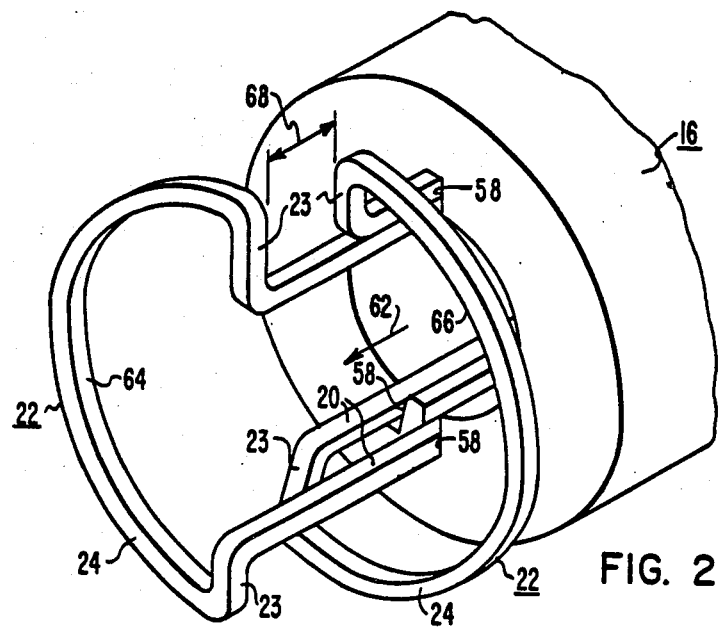
FIG. 2 is a pictorial view of a portion of the end region of a stator core of a dynamoelectric machine showing typical connections between top and bottom coil sides by the annular connector ring segments for the case where a top coil side is longer than a bottom coil side commonly housed in the same slot.
Figure 3:
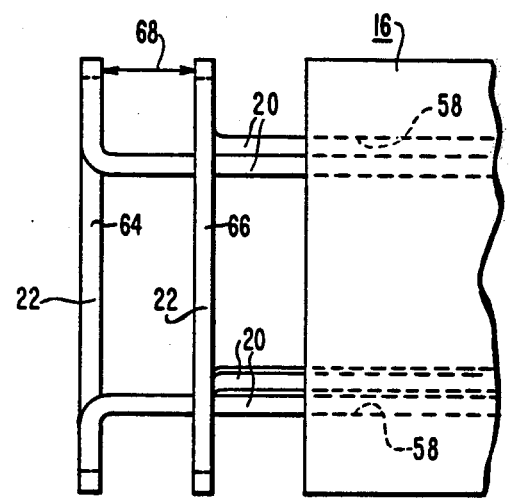
FIG. 3 is a transverse view of the stator core end region illustrated in FIG. 2.

A multiphase stator winding normally has a plurality of multiloop coils each having a number of loops distributed in an even number of stator slots and in the end turn regions of the stator. Each loop of each multiloop coil has two parallel coil sides 20 which are circumferentially separated on the inner periphery of the stator core 17 and a connector ring segment 22 which joins the ends of coil sides 20 and is disposed on a first end of stator structure 16. End turn connections of two coil loops 64 and 66 are shown in FIG. 2. Coil loop 64 includes two straight coil sides 20 disposed in slots 58 of the stator core 17 and connector ring segment 22. The straight coil sides 20 are connected by connector ring segment 22. Several such loops, when joined together on a second end of stator structure 16 by a plurality of connector ring segments 22, form a multiloop coil having parallel sides and end connections. Coil sides 20 which occupy top or radially inner positions in stator slots 58 are generally connected to bottom coil sides which occupy radially outer positions in stator slots 58. FIG. 2 illustrates a coil loop 66 which includes two straight coil sides 20 disposed in slots 58 of the stator 16. As illustrated in FIGS. 2 and 3, coil sides 20 in coil loop 64 extend axially beyond coil sides 20 of loop 66 for a distance represented by reference numeral 68.

FIG. 2 further illustrates the connector ring segments 22 connected to the coil sides 20 which are disposed in the stator slots 58. As can be seen in FIG. 2, top coil sides are generally connected to circumferentially separated bottom coil sides. Each connector ring 22 illustrated has two conductor arm portions 23 which extend radially inwardly from a C-shaped body portion to the respective coil sides 20. It is to be understood that while only two coil loops 64 and 66 are illustrated, many coil loops are usually provided in typical stator windings. Two coil sides 20 (one from each loop) occupy radially adjacent positions in a first slot 58 and are connected to circumferentially separated coil sides housed in second and third slots. For purposes of clarity, only one coil side 20 is illustrated as occupying a top or bottom slot position in the second and third set. However, in actual practice, the radially adjacent or complemental slot position in the second and third slots are each occupied by another coil side 20. Connector ring segments 22 are disposed in planes at discrete axial displacements from stator structure 16 and are axially interspersed according to phase such that a connector ring segment 22 of one phase is axially surrounded by connector ring segments 22 of different phases as better shown in FIG. 6. For example, in a three-phase machine, connector ring segments carrying a particular phase are axially interleaved with connector ring segments carrying the other two phases such that the subject phase connector ring segments occupy every third discrete axial position from stator structure 16. As indicated in commonly assigned copending Ser. No. 139,082, filed Apr. 10, 1980, axial interspersal of the connector ring 22 according to phase drastically reduces the operational electromagnetic forces thereon.

Commonly slotted coil sides 20 of different phase must have different axial lengths if phase interspersed connector ring segments 22 are to be used since all connector ring segments 22 in each displaced axial plane must be at the same phase. For most cases where phase interspersed connector ring segments 22 are used, commonly slotted coil sides (having the same and different phase) include top coil sides 20 which have relatively long and short lengths, respectively. Connection of the commonly slotted coil sides to circumferentially separated bottom and top coil sides 20, respectively, is provided by connector ring segments 22 illustrated in FIGS. 2 and 3. However, as dictated by winding topology, troublesome cases arise where the top coil side 20 is axially shorter than the commonly slotted bottom coil side. The troublesome cases arise because the connector ring segments standard radial arm portions 23 joined to the top coil side 20 interferes with the radially outwardly adjacent bottom coil side. The troublesome cases can be minimized for any machine having phase interspersed connector ring segments 22, but they cannot be eliminated.

Figure 4:
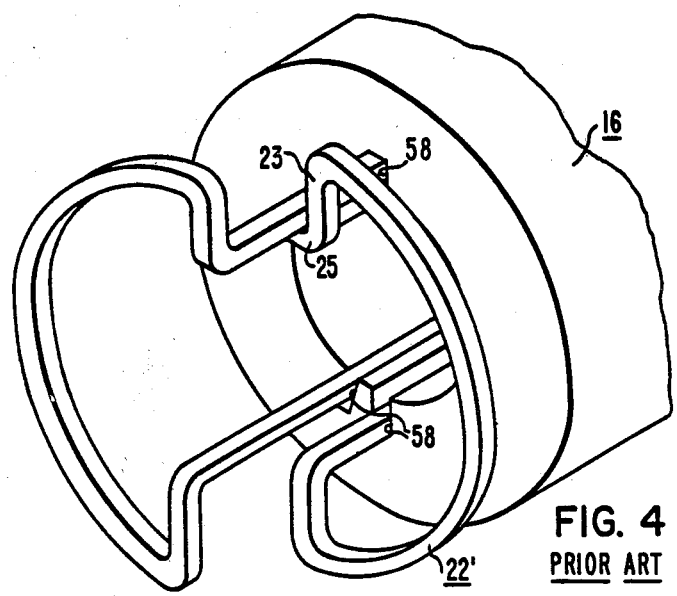
FIG. 4 is a pictorial view of a portion of a stator's end region illustrating a connection technique for the case where the bottom coil side is axially longer than the top coil side housed in the same slot.

FIG. 4 is a pictorial view of one end of stator structure 16 illustrating a connection solution for the troublesome cases. A modified connector ring segment 22' having circumferential clearance portion 25 disposed between radial arm portion 23 and the top coil side 20 provides a structure suitable for overcoming the connection problems for the aforementioned troublesome cases. Circumferential clearance portion 25 extends peripherally a distance sufficient for the connected radial arm portion 23 to clear the commonly slotted bottom coil side 20. Disadvantages of such modified connector ring segment 22' include complex fabrication and operational force levels per inch of connector ring segment significantly higher than elsewhere in the winding.

It should be understood that FIGS. 2 and 3 represent the coil side interconnections (i.e. each radially outer coil is electrically connected to a radially inner coil) presently utilized in turbine generator stator coil systems and that FIG. 4 illustrates the circumferential clearance portion 25 of certain coil sides which is necessitated by the above-mentioned interconnection scheme. It is the elimination of this clearance portion 25 to which the present invention is directed.

Figure 5:
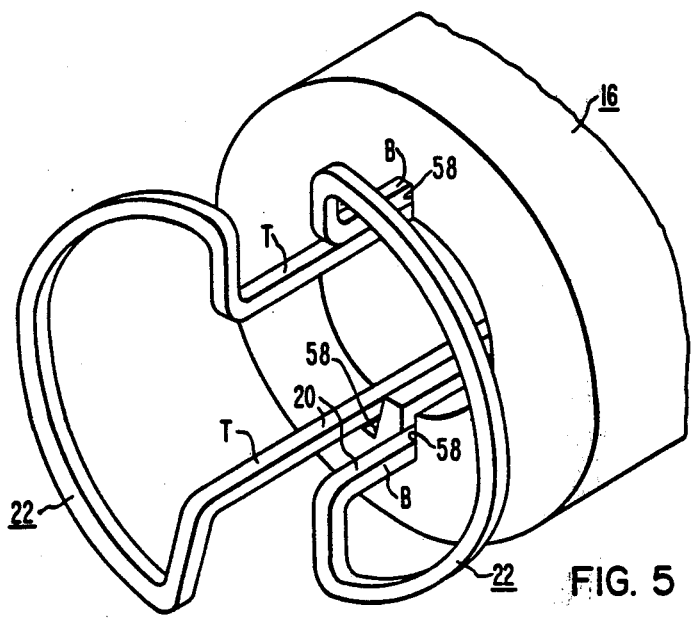
FIG. 5 is a pictorial view of a portion of a stator's end region illustrating the present invention.
Figure 6:
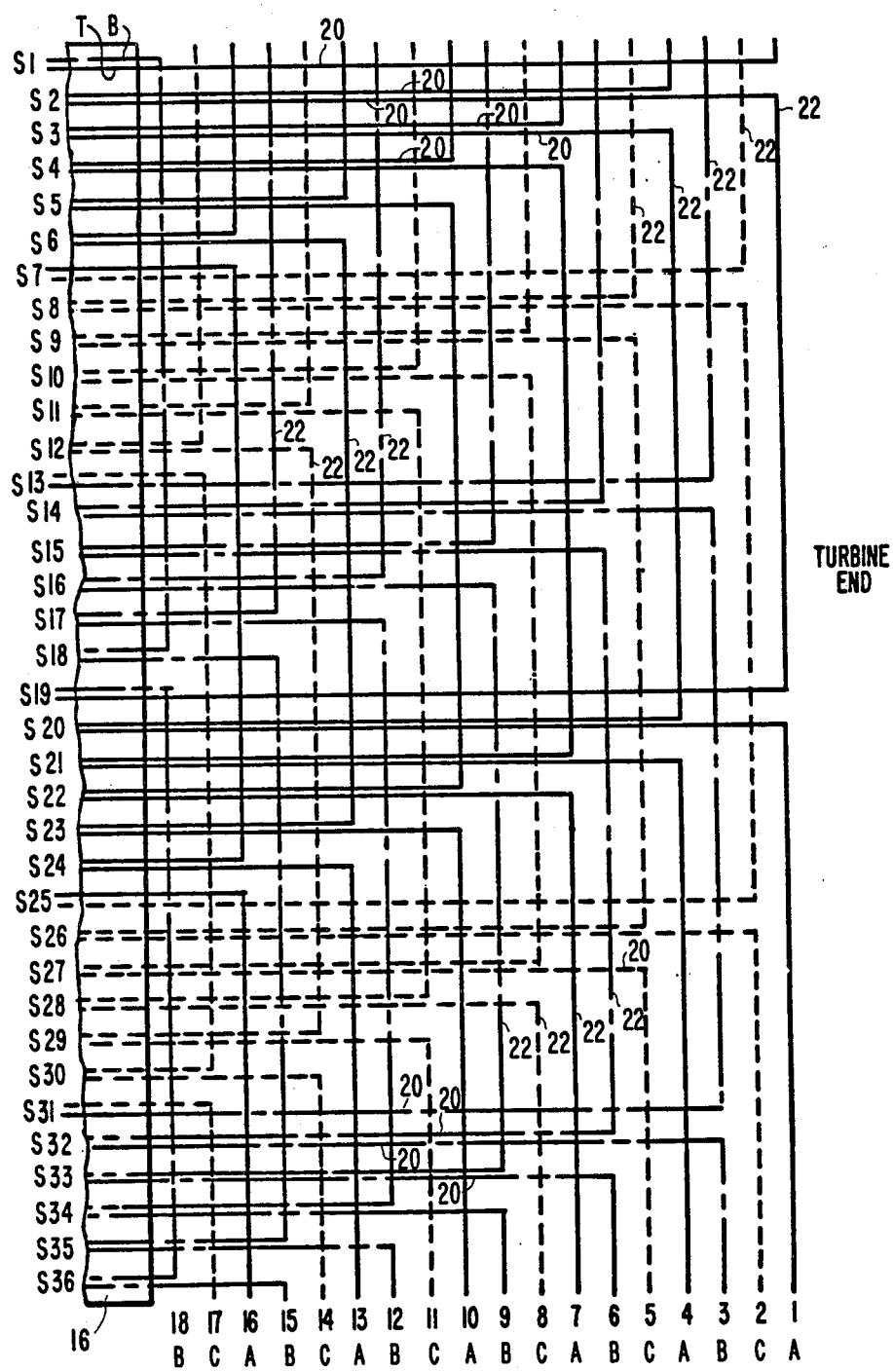
FIG. 6 is a schematic diagram of a portion of a stator winding incorporating inventive aspects of the present invention.

FIGS. 5 and 6 illustrate the present invention winding in pictorial and schematic views, respectively. Generally, coil sides 20 in all slots having axially longer bottom coil sides 20 than top coil sides 20 should be interchanged. In other words, connections to those coil sides 20 should be reversed such that the top coil side in the subject slot connected at both ends of the stator to top coil sides 20 in different slots rather than the typical top-to-bottom connections. Likewise, the bottom coil side 20 in the subject slot is connected at both ends of the stator to bottom coil sides 20 in different slots. Thus, commonly slotted top and bottom coil sides (labeled T and B) 20 are respectively joined to other top and bottom coil sides circumferentially displaced therefrom in different slots. As can be seen, the standard connector ring segments 22 can then be used for joining coil sides 20 throughout the winding.

FIG. 6 is a radial view of one stator end turn region in which the invention is embodied. In contradistinction to the typical top coil side to bottom coil side connections described above and illustrated in FIGS. 2, 3 and 4, the present invention connects preselected top coil sides to other preselected top coil sides and also connects preselected bottom coil sides to other preselected bottom coil sides as shown pictorially in FIG. 5 and schematically in FIG. 6. In FIG. 6, a thirty-six slot machine is represented as it would appear in a radially outward view laid flat. Each slot, S1 through S36, has two coil sides 20 disposed therein. In each slot, the upper of the two coil sides 20 is the bottom coil side B and the lower of the two coil sides 20 is the top coil side T. As can further be seen in FIG. 6, eighteen axial end turn positions, 1 to 18, are represented with phases A, B and C being interleaved. These axial positions are the physical locations in which the C-shaped connector rings 22 are disposed. For purposes of clarity, only selected coil sides 20 and connector rings 22 have been labeled. As can be seen in FIG. 6, many of the connections provide electrical communication between top and bottom coils (e.g. the top coil of slot 17 connected to the bottom coil of slot 34 and the bottom coil of slot 27 connected to the top coil of slot 10). However, in order to avoid the necessity of specially shaped coils (e.g. reference numeral 25 of FIG. 4), certain preselected top coil sides are electrically connected to other top coil sides and preselected bottom coil sides. By example, the top coil sides 20 rather than the bottom coil sides in slots 1, 7, 13, 19, 25, and 31 are connected to top coil sides in slots 20, 26, 32, 2, 8, and 14, respectively. The bottom coil sides in slots 1, 7, 13, 19, 25, and 31 are likewise connected to bottom coil sides in slots 18, 24, 30, 36, 6 and 12, respectively. Similar interchanging of coil side connections is required on the exciter end (turbine end is shown) for the slots where the top coil side is shorter than the radially adjacent bottom coil side. Although the invention is shown embodied in a 36 stator slot machine, it is to be understood that the connections for any number of slots may be provided in the aforementioned prescribed manner.

What is claimed is:
1. A dynamoelectric machine comprising:
   a generally tubular-shaped stator core having a plurality of slots in the periphery of said stator core;
   a multiphase winding constituting a first plurality of coil sides receivable in a first plurality of said stator core slots, each of said first plurality of stator slots having a top one and a bottom one of said first plurality of coil sides disposed therein, each of the top coil sides of said first plurality of coils sides being electrically connected to a preselected bot- tom coil side of said first plurality of coil sides, each of the bottom coil sides of said first plurality of coil sides being electrically connected to a preselected top coil side of said first plurality of coil sides, a second plurality of coil sides receivable in a second plurality of said stator slots, each of said second plurality of stator slots having a top one and a bottom one of said second plurality of coil sides disposed therein, each of a preselected number of the top coil sides of said second plurality of coil sides being electrically connected to a preselected top coil side of said second plurality of coil sides, each of a preselected number of the bottom coil sides of said second plurality of coil sides being electrically connected to a preselected bottom coil side of said second plurality of coil sides; and a plurality of generally C-shaped connector ring segments disposed on both axial ends of the stator core and each joining two coil sides, said connector ring segments being axially interspersed according to phase.

2. The dynamoelectric machine of claim 1 wherein said slots each have a top coil side which is axially longer than the bottom coil side.

3. A dynamoelectric machine comprising:
a generally tubular-shaped stator core having axially extending slots disposed about the core's inner periphery; and
a multiphase winding, disposable in said slots, said winding comprising:

a first plurality of coil loops circumscribed about one another each of which has two coil sides separated by a pole pitch, one of said sides occupying a radially inner position and the other coil side occupying a radially outer position in said slots;

a first plurality of connector ring segments disposed on both axial ends of said stator core for individually joining the inner coil sides to the outer coil sides of said first plurality of coil loops;

a second plurality of coil loops each of which has two coil sides separated by a pole pitch, said two coil sides occupying inner positions in said slots;

a second plurality of connector ring segments disposed on both axial ends of said stator core for joining the inner coil sides of said second plurality of coil loops;

a third plurality of coil loops each of which has two coil sides separated by a pole pitch, said two coil sides occupying radially outer positions in said slots; and a third plurality of connector ring segments disposed on both axial ends of said stator core for joining the outer coil sides of said third plurality of coil loops.

4. The dynamoelectric machine of claim 3 wherein said connector ring segments have equal arcuate lengths.

5. The dynamoelectric machine of claim 3 wherein each radially inner coil side is axially longer than the radially outer coil side occupying the same stator slot.

* * * * *